United States Patent

Lammas et al.

[11] Patent Number: 6,033,185
[45] Date of Patent: Mar. 7, 2000

[54] STRESS RELIEVED DOVETAIL

[75] Inventors: Andrew J. Lammas, Maineville; William T. Dingwell, West Chester; Anthony E. Hungler, Cincinnati, all of Ohio

[73] Assignee: General Electric Company, Cincinnati, Ohio

[21] Appl. No.: 09/161,935

[22] Filed: Sep. 28, 1998

[51] Int. Cl.⁷ ...................................................... F01D 5/30
[52] U.S. Cl. ..................... 416/193 A; 416/215; 416/216; 416/218; 416/219 R; 416/220 R; 416/248
[58] Field of Search .............................. 416/193 A, 215, 416/216, 217, 218, 219 R, 220 R, 248

[56] References Cited

U.S. PATENT DOCUMENTS

| | | | |
|---|---|---|---|
| 4,802,824 | 2/1989 | Gastebois et al. | 416/193 A |
| 4,824,328 | 4/1989 | Pisz et al. | 416/219 R |
| 5,100,292 | 3/1992 | Matula et al. | 416/220 R |
| 5,110,262 | 5/1992 | Evans | 416/219 R |
| 5,141,401 | 8/1992 | Juenger et al. | |
| 5,160,242 | 11/1992 | Brown | 416/193 A |
| 5,435,694 | 7/1995 | Kray et al. | 416/219 R |
| 5,554,005 | 9/1996 | Nguyen | 416/219 R |
| 5,741,119 | 4/1998 | Heppenstall | 416/219 R |

*Primary Examiner*—Edward K. Look
*Assistant Examiner*—Matthew T. Shanley
*Attorney, Agent, or Firm*—Andrew C. Hess; Nathan D. Herkamp

[57] ABSTRACT

A rotor blade includes an airfoil, an integral platform, and a dovetail integrally joined to the platform. The dovetail includes a neck extending between a pair of dovetail lobes configured to engage a complementary slot in a rotor disk. The dovetail includes an undercut extending between an outer face of the dovetail lobes and the neck for introducing a stress concentration thereat. The stress concentration relieves stress at the outer face at the expense of the neck for increasing the high cycle fatigue life of the blade.

19 Claims, 2 Drawing Sheets

STRESS RELIEVED DOVETAIL

BACKGROUND OF THE INVENTION

The present invention relates generally to gas turbine engine, and, more specifically, to compressor rotor blades therein.

In one of type of gas turbine engine, a multistage axial compressor pressurizes air which is mixed with fuel in a combustor and ignited for generating hot combustion gases which flow downstream through a high pressure turbine which extracts energy therefrom for powering the compressor. Each compressor stage includes a row of circumferentially adjoining compressor rotor blades extending radially outwardly from a supporting rotor disk. Each blade includes an airfoil over which the air being pressurized flows, and a platform at the root of the airfoil which defines the radially inner boundary for the compressor airflow.

The blades are typically removable, and therefore include a suitable dovetail configured to engage a complementary dovetail slot in the perimeter of the rotor disk. The dovetails may either be axial-entry dovetails or circumferential-entry dovetails which engage corresponding axial or circumferential slots formed in the disk perimeter. A typical dovetail includes neck of minimum cross sectional area extending integrally radially inwardly from the bottom of the blade platform which then diverges outwardly into a pair of opposite dovetail lobes or tangs.

For axial dovetails, the rotor disk includes a plurality of circumferentially spaced apart, axially extending dovetail slots defined circumferentially between corresponding disk posts. The axial slots and disk posts extend the full axial thickness of the disk between its axially forward and aft faces.

For a circumferential dovetail, a single dovetail slot extends circumferentially around the entire perimeter of the disk, and axially between forward and aft imperforate posts. The circumferential slot is locally enlarged at one location for allowing the individual circumferential dovetails to be initially inserted radially therein and then repositioned circumferentially along the dovetail slot until the entire slot is filled with a full row of the blades.

In both types of dovetails, the corresponding disk posts include complementary lobes or tangs which cooperate with the dovetail lobes to radially retain the individual blades against centrifugal force during operation. Each dovetail lobe includes a radially outwardly facing outer pressure surface or face which engages a corresponding radially inwardly facing pressure surface or face of the disk posts. As centrifugal load is generated by the blade during rotation, it is carried radially outwardly from the dovetail lobes into the corresponding disk posts at the engaging outer and inner pressure faces thereof.

Since the dovetail necks have minimum cross sectional area between the blade platforms and the dovetails themselves, maximum centrifugal stress is experienced at the necks which must be limited for ensuring blade life. A typical compressor blade is designed for an infinite life which requires suitably large dovetails and necks thereat for experiencing centrifugal stress suitably below the strength limits of the blade material.

The rotor disks, in contrast, have a finite limited useful life since they are more highly stressed than the blades which they retain. Since axially extending dovetail slots in a disk perimeter interrupt that perimeter along its circumference, an axial-entry rotor disk reacts the centrifugal loads in a different manner than that of the circumferential-entry rotor disks in which the two corresponding disk posts are full circumferential hoops having a correspondingly high hoop strength.

In one type of turbofan aircraft gas turbine engine which entered commercial service in this country in the previous decade, mid-life experience thereof first uncovered fatigue cracks in a statistically small, yet significant, number of axial dovetails and the rotor disks therefor. This is undesirable since a crack in a single dovetail uncovered in a periodic maintenance inspection requires replacement of a full set of the blades, or replacement of the rotor disk if the crack is found therein instead.

To improve the fatigue life of the rotor disk for axial dovetails, an improvement in the axial dovetail slots was patented by the present assignee in U.S. Pat. 5,141,401-Juenger et al.

Although that same type of engine includes both axial-entry and circumferential-entry dovetails, cracks in the latter were not observed at mid-life inspections in view of the different and stronger configuration of the circumferential-entry dovetails and slots therefor. However, further continued life of the same engines into the present decade have now uncovered yet again a statistically small occurrence of cracking in circumferential dovetails at very high-life cycles or time. Again, since compressor blades are preferably designed for infinite life, even a single crack in one blade dovetail requires the replacement of the entire set of compressor blades, with a correspondingly high cost therefor.

However, in view of the difference in configuration between axial and circumferential dovetails, a different solution for high-time circumferential dovetail cracking is required.

Accordingly, it is desired to provide an improved circumferential-entry compressor rotor blade and cooperating rotor disk.

BRIEF SUMMARY OF THE INVENTION

A rotor blade includes an airfoil, an integral platform, and a dovetail integrally joined to the platform. The dovetail includes a neck extending between a pair of dovetail lobes configured to engage a complementary slot in a rotor disk. The dovetail includes an undercut extending between an outer face of the dovetail lobes and the neck for introducing a stress concentration thereat. The stress concentration relieves stress at the outer face at the expense of the neck for increasing the fatigue life of the blade.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
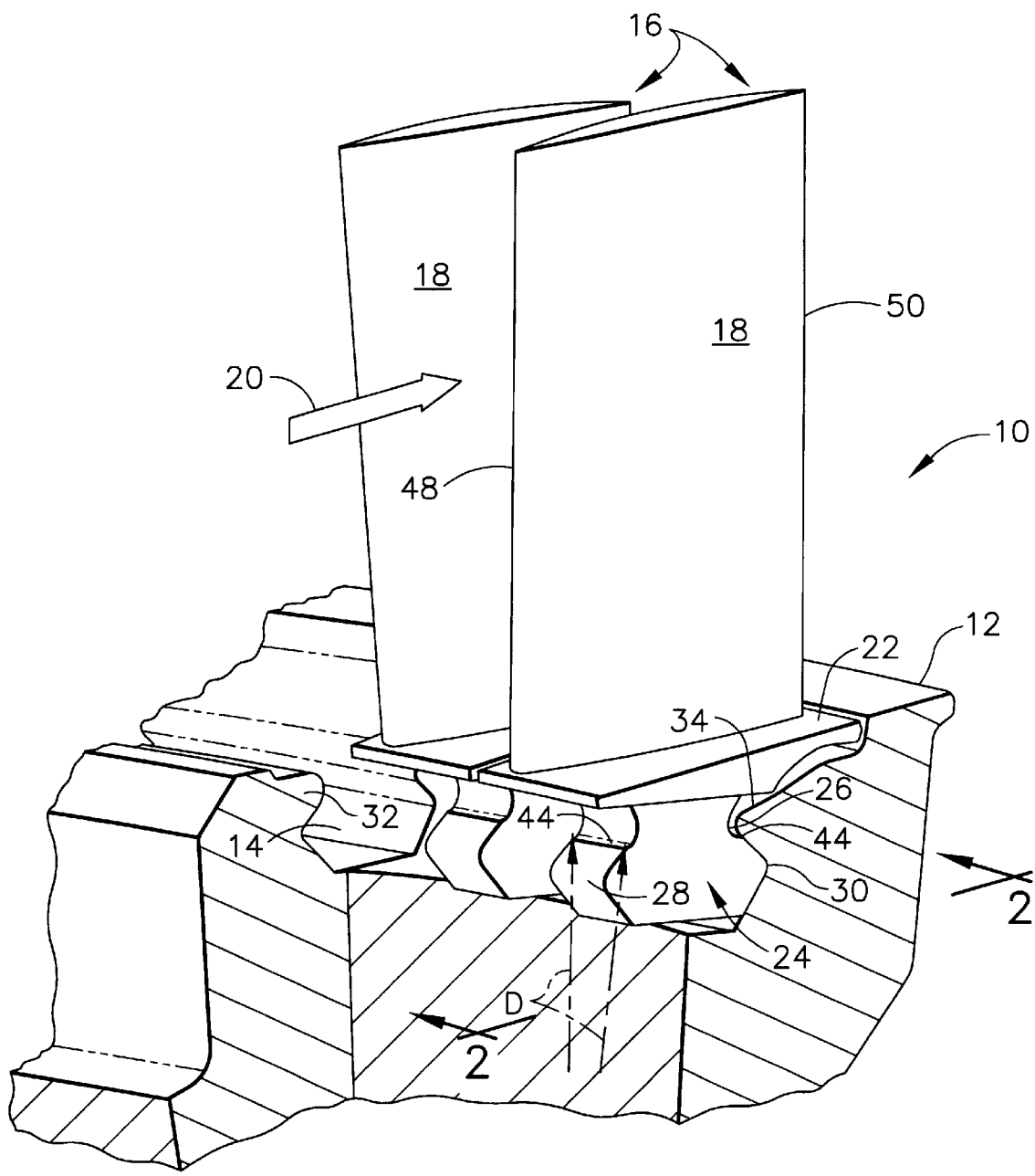
FIG. 1 is an isometric view of a portion of a gas turbine engine compressor rotor disk having a circumferential dovetail slot for receiving a plurality of compressor rotor blades having circumferential-entry dovetails in accordance with an exemplary embodiment of the present invention.

Illustrated in FIG. 1 is a portion of a multistage axial compressor 10 of a gas turbine engine, such as a turbofan engine for powering an aircraft in flight. The compressor includes a rotor disk 12 having a circumferential slot 14 in the perimeter thereof.

A plurality of circumferentially adjoining compressor rotor blades 16 are removably mounted in the disk slot 14. Each blade 16 includes an airfoil 18 over which air 20 is channeled during operation for pressurizing thereof. Integrally joined to the root of the airfoil is a corresponding platform 22 which defines the radially inner flowpath boundary for the air 20 being compressed.

Each blade 18 also includes a circumferential-entry dovetail 24 integrally joined to the platform 22 and extending radially inwardly therefrom. Each dovetail 24 includes a neck 26 of minimum radial cross sectional area extending axially between a pair of dovetail tangs or lobes 28,30 configured to engage the disk slot 14 to radially retain the individual blades 18 to the disk perimeter.

Figure 2:
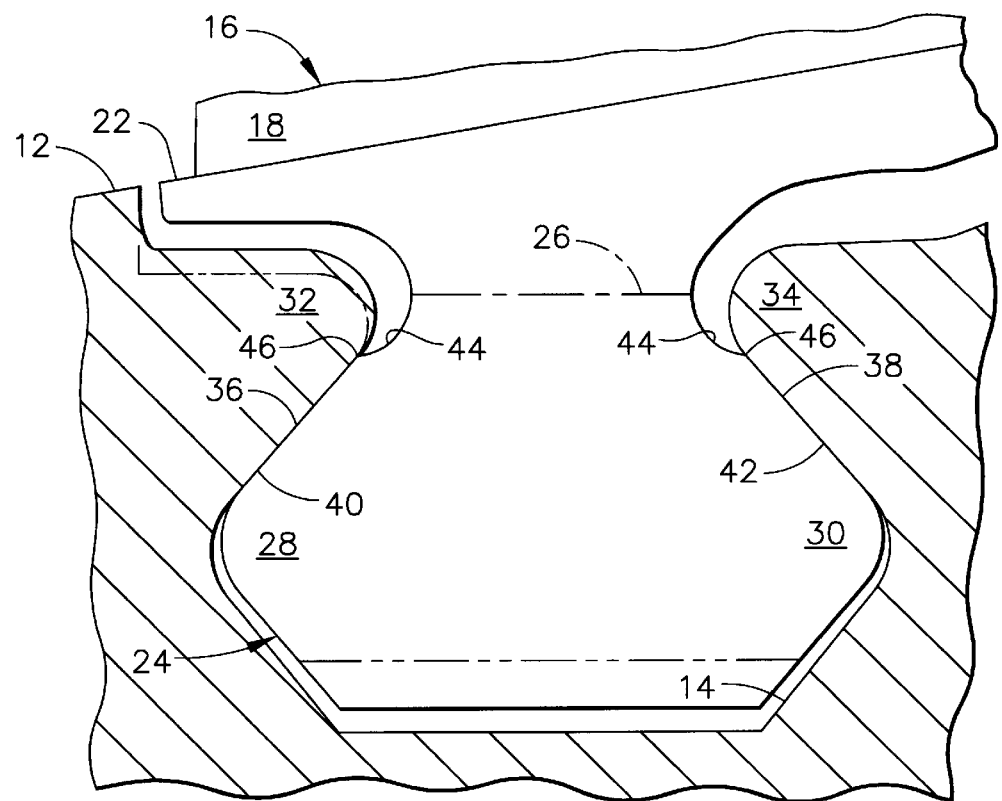
FIG. 2 is an enlarged, axial sectional view through a portion of the rotor disk and dovetails illustrated in FIG. 1 and taken along line 2—2.

As illustrated in more particularity in FIG. 2, the rotor disk 12 includes a circumferentially continuous forward post defining a corresponding axially forward disk tang or lobe 32 facing radially inwardly to engage the dovetail forward lobe 28. Similarly, the disk also includes an axially aft post defining an aft tang or lobe 34 which engages the corresponding dovetail aft lobe 30.

The dovetail lobes 28,30 include radially outer, forward and aft pressure faces 36,38 facing radially outwardly to engage corresponding radially inner, forward and aft pressure faces 40,42 facing radially inwardly from the corresponding disk lobes 32,34 defining the disk slot 14.

In accordance with the present invention, the dovetail 24 also includes an undercut 44 extending between at least one of the outer faces 36,38, and preferably both, and the neck 26 for introducing a local stress concentration thereat. Stress concentrations are normally reduced or eliminated wherever possible in conventional practice since maximum utilization of a material typically corresponds with minimizing the stress therein. The conventional dovetail over which the present invention is an improvement has a continuous and smooth radius from the corresponding dovetail lobes thereof to the neck for minimizing stress concentration in this region for promoting high dovetail life. This conventional contour is illustrated in phantom in more detail in FIG. 3 along with an exemplary form of the undercut 44 thereat.

It has been discovered using detailed analysis that the introduction of a local stress concentration provided by the undercut 44 can substantially relieve the maximum stress experienced by the dovetail 24 during operation, and thereby increase its useful life above the high cycles previously achieved for the basic blade. But for the introduction of the specific undercut 44, the remainder of the compressor blades 16 may be conventional in configuration and function, such as the compressor blade presently enjoying commercial service in this country for over a decade, and over which the present invention is an improvement.

Figure 3:
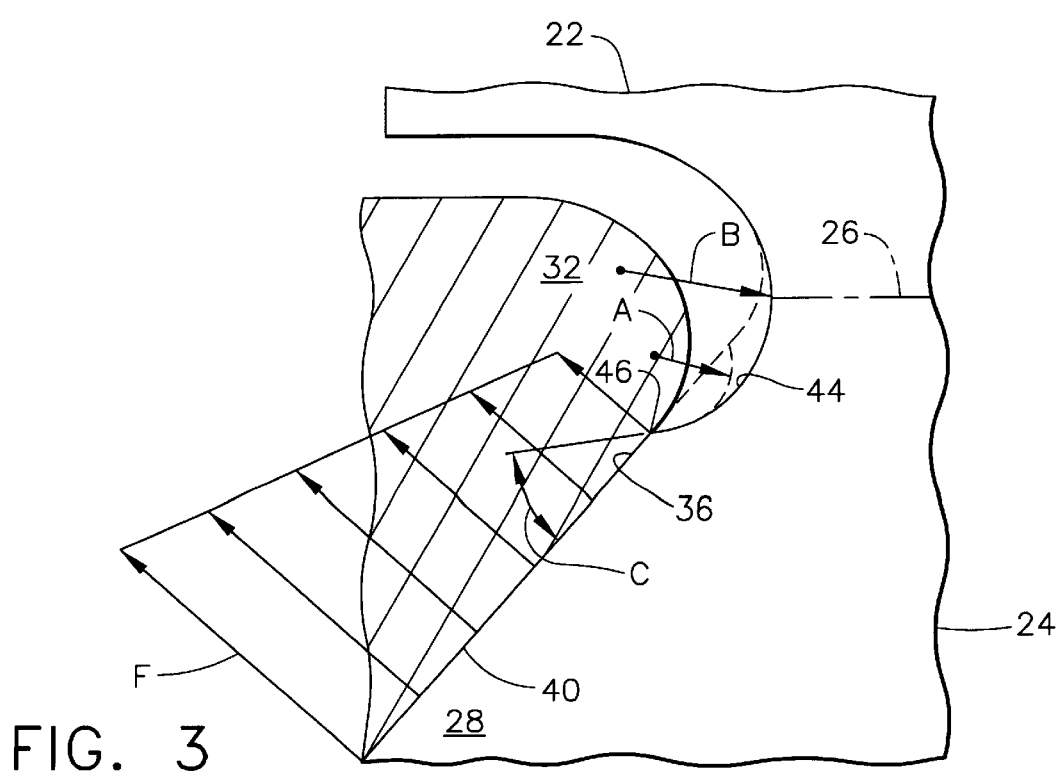
FIG. 3 is an enlarged, partly section view of one of the dovetail lobes and adjacent neck having an undercut therebetween in accordance with an exemplary embodiment of the present invention cooperating with a corresponding portion of the rotor disk.

As the rotor blades are rotated during operation, centrifugal force is generated thereby and is carried in turn through the dovetails thereof into the corresponding rotor disk lobes. As shown in FIG. 3, the corresponding outer and inner pressure faces 36,40 are typically straight or flat in axial profile and engage each other over the effective contact area therebetween for carrying the centrifugal loads, designated F, in a normal or perpendicular direction therebetween from the dovetail to the rotor disk.

The centrifugal load of all the material above the neck 26 must be carried therethrough, which in conventional practice defines the life limiting section of the dovetail which must be suitably large for maintaining the maximum stress thereat suitably below the fatigue strength of the blade material. Since the size and configuration of the airfoils 18 are controlled by the required aerodynamic performance of the blade, the dovetail and disk design must be suitably tailored for supporting the required airfoil with limited stress for ensuring the required lives of the blades and disk.

Since the outer and inner faces 36,40 engage during operation, they are also subject to friction therebetween. Friction generates a force parallel to the lobe faces and perpendicular to the direction of the normal force F. The magnitude of the friction force is based on the coefficient of friction between the engaging faces, and wear or fretting may occur due to differential sliding movement therebetween. The friction forces in turn generate additional surface stress at the engaging faces which also affects the complexity of the dovetail design. Friction may be minimized by applying a dry film lubricant, such as molydisulfide, to the engaging pressure faces of the dovetail and disk. However, such lubricant wears over the blade life, and as it wears the frictional surface stress increases.

Analysis has uncovered that the shear stress created by the friction forces along the dovetail lobe outer faces 36,38 varies thereover to a maximum stress concentrated at the radially outer edge 46 thereof where it breaks away from the forward post inner face 40. Both steady-state and vibratory components of the stress field at the forward and aft outer edges 46, also referred to as edge of contact, are locally increased by the friction affect.

These friction induced local stresses at the outer edges 46 are minimum in blade early life when the dry lubricant is most effective, and increase over the life of the blade as the dry lubricant wears. Accordingly, it has been discovered that the maximum dovetail stress may be initially found at the dovetail neck 26 in early blade life, but then transitions to at least one of the outer edges 46 of the two outer pressure faces 36,38 at mid-life. This mid-life transition in maximum stress can then lead to a shortening in remaining available life of the blade dovetails, with any cracking therein requiring replacement of the entire set of rotor blades of the same disk.

By introducing the undercut 44 at one or both of the outer edges 46 of the dovetail pressure faces, a deliberate stress concentration is introduced thereat which would be unacceptable in a rotor blade according to conventional practice, but-for the secondary advantages thereof in accordance with the present invention. Although the undercuts 44 initially may increase the maximum stress experienced the blade dovetail 24 in early blade life, the same undercuts 44 significantly reduce the maximum stress which would otherwise occur at the outer edges 46 due to friction as the dry lubricant wears during operation above mid-life. A relatively higher early life stress increase in the blade dovetails is beneficially offset by a substantial reduction in later life stress of the dovetails as the frictional forces increase, for substantially increasing the overall life of the blade dovetail over that previously experienced in the same dovetails without the undercuts 44.

Accordingly, the maximum stress experienced by the dovetail 24 may be relieved by specifically introducing a local stress concentration using the undercut 44 between either one of the dovetail lobes 28,30 and the adjacent dovetail neck 26. In this way, stress at the dovetail outer faces 36,38 at the outer edges 46 thereof may be substantially relieved by instead increasing stress at the dovetail neck 26.

In a given blade design, a given amount of centrifugal load must be carried by the dovetail 24 into the rotor disk 12, irrespective of the specific configurations of the dovetail 24 and disk slot 14. However, by specifically configuring the dovetail 24 as described above, the load distribution and corresponding stress pattern therefrom may be preferentially changed for locally increasing stress at the dovetail neck during early blade life, while correspondingly decreasing maximum blade stress at the outer edges 46 during later blade life for providing an improved dovetail having enhanced life.

As shown in FIG. 3, the undercut 44 is preferably arcuate in axial section to change the surface contour of the dovetail lobe 28 between the outer face 36 thereof and the adjacent neck 26. Since the undercut 44 is a stress concentration, it is desired to decrease the undesirable affects thereof nearthe-neck26.

For example, the undercut 44 illustrated in FIG. 3 may be initially introduced by providing a relatively small first radius of curvature A thereof adjacent the outer face 36 at the outer edge 46, with the undercut 44 then changing its contour to a greater radius of curvature B in the axial direction adjacent the neck 26. The undercut 44 breaks away from the surface of the outer face 36 at an acute angle C of about 300-400 for example.

The undercut at its first, small radius A may therefore be shielded by the larger radius B, or, alternatively, the undercut 44 may vary in contour by several changes in radius from the outer edge 46 to the neck 26. In this way, the undercut 44 transitions from an abrupt or discontinuous form at the edge of contact 46 to a gradual arc up to the neck 26, and minimizes the reduction in cross sectional area of the neck 26 as much as possible within the available space.

Accordingly, the undercut 44 may be sized in depth into the dovetail relative to the outer pressure face, and contoured in radius for preferentially relieving stress at the dovetail outer faces 36,38 at the outer edges 46 thereof, by instead increasing stress at the neck 26. A stress increase early in blade life allows significant stress relief in later blade life.

As shown in the FIG. 1 exemplary embodiment, the disk slot 14 extends circumferentially around the rotor disk 12, and the dovetails 24 are circumferential dovetails in contrast with axial dovetails. The airfoils 18 each include a leading edge 48 and an axially opposite trailing edge 50 over which is channeled the air 20 during operation in a downstream direction therebetween. The dovetail forward lobe 28 faces axially forwardly in the upstream direction, and the dovetail aft lobe 30 faces axially aft in the downstream direction. Correspondingly, the forward outer face 36 as illustrated in FIG. 2 is disposed upstream of the aft outer face 38.

In this configuration, the disk slot 14 extends circumferentially and is therefore annular about the centerline axis of the disk, and the individual dovetails 24 are arcuate in the circumferential direction around the disk slot 14. It is therefore preferred to introduce the undercut 44 in the dovetail 28,30 to match the circumferential curvature of the disk slot 14 at the respective forward and aft inner faces 40,42 of the disk lobes 32,34.

For example, FIG. 1 illustrates that the undercut 44 for the forward dovetail lobe 28 has a radius of curvature D relative to the centerline axis of the disk which matches the radius of curvature of the corresponding disk forward lobe 32. In this way, the undercut 44 does not diminish the contact area of the dovetail and disk lobes, but instead maximizes that area for reducing the magnitude of the normal centrifugal loads transferred from the dovetail into the disk lobes.

As the air 20 illustrated in FIG. 1 is pressurized by the rotating airfoils 18, the airflow pressure at the airfoil trailing edge 50 is correspondingly greater than the airflow pressure at the leading edge 48. This in turn creates a counterclockwise bending moment on the individual airfoils 18 which is reacted by different normal centrifugal loads at the forward and aft dovetail lobes 28,30. Analysis has uncovered that unlike the normal centrifugal force F profile illustrated in FIG. 3, a conventional dovetail forward lobe will experience greater normal force F at the outer edge 46 which decreases along the outer pressure face thereof to the radially inner end thereof. The high normal force at the forward outer edge 46 correspondingly increases the local stress thereat. However, by providing the forward undercut 44 for at least the dovetail forward lobe 28, significant stress relief may be provided thereat as described above.

Since the pressure induced bending moment on the airfoils 18 effects a different normal force along the aft dovetail lobe 30, as opposed to the forward lobe 28, the undercut 34 may or may not be used therewith. In the preferred embodiment illustrated in FIG. 2, an aft one of the undercuts 44 is also disposed between the aft outer face 38 and the neck 26 in similar manner to the forward undercut 44 at the forward lobe 28 to provide stress relief at both locations.

Since the respective forward and aft undercuts 44 are disposed in most part radially below the dovetail neck 26, they minimize the reduction in cross sectional area thereof, yet still provide suitable transitions to the corresponding forward and aft outer faces 36,38 for effecting stress relief.

In an exemplary embodiment, the depth of the undercuts 44 compared to the original blade dovetail without undercuts is as little as about 0.25 mm for achieving stress relief and a substantial increase in high cycle fatigue life of the dovetails. Furthermore, this improved fatigue life may be obtained without changing the configuration of the disk slot 14 itself, which allows retrofit into existing engines in service by simply replacing used compressor blades with new undercut compressor blades.

Since the maximum stress experienced by the dovetail outer faces 36,38 includes a frictional component which increases as the dry lubricant thereon wears during operation, that stress may be controlled by varying the magnitude of the normal pressure force F on the dovetail lobes.

In accordance with another feature of the present invention, means are provided for changing or adjusting the relative stiffness of the dovetail 24 at the forward outer face 36 and the disk 12 at the corresponding forward inner face 40 to effect the normal load profile F illustrated in FIG. 3 which is generated under centrifugal force with an increasing magnitude radially inwardly away from the outer edge 46 over the radial extent of the outer face 36. In this way, relative dovetail/disk stiffness may be tailored to minimize the edge of contact loading at the forward outer edge 46.

As indicated above, the improved load profile F illustrated in FIG. 3 is opposite in configuration than the conventionally effected load profile and may be used in combination with the forward undercut 44 for enhancing dovetail stress relief.

The relative stiffness may be adjusted by sizing the dovetail 24 as illustrated in FIG. 2 with greater radial height with a lower radially inner base or root as compared with the conventional dovetail root illustrated in phantom, to substantially fill the available space in the dovetail slot 14. Sufficient space exists in the conventional dovetail slot 14 to increase the depth of the dovetail 14 for correspondingly increasing the rigidity of the dovetail 24 itself. The corresponding forward and aft lobes 28,30 are therefore more rigid, and as a result thereof the preferred contact force profile F illustrated in FIG. 3 may be effected which minimizes the contact force at the forward outer edge 46, and thereby also reduces the frictional stress affected thereby in conjunction with the stress relief provided by the forward undercut 44.

Alternatively, or in addition, the forward disk lobe 32 may be made more flexible than the conventional lobe by decreasing its radial height as illustrated in phantom line in FIG. 2. The increased flexibility of the disk forward lobe 32 also promotes the increasing contact force profile illustrated in FIG. 3, with minimum contact force at the forward outer edge 46. However, increasing the flexibility of the disk lobe 32 requires machining thereof, and would therefore be preferable in a new compressor design over a retrofit application.

Accordingly, with relatively minor changes in an otherwise conventional circumferential dovetail 24, at least the forward undercut 44, and preferably also the aft undercut 44, may be introduced therein without significantly decreasing the load carrying area of the neck 26, and without adversely affecting the load carrying capability of the two dovetail lobes 28,30 while providing substantial stress relief therein. The improved dovetail blade 24 fits within the existing envelope of a conventional circumferential dovetail slot 14, and therefore allows the retrofit of the improved blade 16 therein. An early life increase in maximum dovetail stress is offset by a significant reduction in later life dovetail maximum stress, with a corresponding increase in the fatigue life of the blade.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A gas turbine engine rotor blade mountable in a rotor disk slot, comprising:
   an airfoil;
   a platform integrally joined to said airfoil; and
   a dovetail integrally joined to said platform, and including a single neck of minimum cross sectional area extending between a pair of dovetail lobes configured to engage said disk slot;
   each of said lobes including an outer face facing outwardly to engage corresponding inner faces of said disk slot; and
   an undercut extending between at least one of said outer faces and said neck for introducing a stress concentration thereat.

2. A blade according to claim 1 wherein said undercut is arcuate to change contour of said lobe between said one outer face and said neck.

3. A blade according to claim 2 wherein said undercut has a greater radius of curvature adjacent said neck than adjacent said outer face.

4. A blade according to claim 3 wherein said disk slot extends circumferentially, and said dovetail is a circumferential dovetail.

5. A blade according to claim 4 wherein said airfoil includes leading and trailing edges for channeling air in a downstream direction therebetween, and said one outer face is a forward outer face disposed upstream of said other outer face being an aft outer face.

6. A blade according to claim 5 wherein said undercut is arcuate circumferentially to match curvature of said disk slot at a forward one of said inner faces.

7. A blade according to claim 5 wherein said undercut is sized and contoured to relieve stress at said forward outer face by instead increasing stress at said neck.

8. A blade according to claim 5 further comprising an aft one of said undercuts disposed between said aft outer face and said neck.

9. A blade according to claim 5 further comprising means for adjusting relative stiffness of said dovetail at said forward outer face and said disk at said corresponding inner face to effect a normal load profile therebetween under centrifugal force increasing away from said undercut.

10. A blade according to claim 9 wherein said adjusting means comprise sizing said dovetail in radial height to substantially fill said dovetail slot.

11. A method of relieving stress in a circumferential dovetail of a rotor blade mounted in a complementary slot in a rotor disk comprising introducing a stress concentration between at least one of a single pair of dovetail lobes and an adjacent dovetail neck.

12. A method according to claim 11 wherein said dovetail lobe includes an outer face facing outwardly to engage a corresponding inwardly facing inner face of said disk slot, and said stress concentration is effective for relieving stress at said outer face by instead increasing stress at said neck.

13. A method according to claim 12 further comprising adjusting relative stiffness of said dovetail at said forward outer face and said disk at said corresponding inner face to effect a normal load profile therebetween under centrifugal force increasing radially inwardly.

14. A gas turbine engine rotor blade mountable in a rotor disk slot, comprising:
   an airfoil;
   a platform integrally joined to said airfoil; and
   a dovetail integrally joined to said platform, and including a neck of minimum cross sectional area extending between a single pair of dovetail lobes configured to engage said disk slot;
   each of said lobes including an outer face facing outwardly to engage corresponding inner faces of said disk slot, with each outer face having an outer edge of contact for breaking away from said inner faces; and
   an undercut extending between at least one of said outer faces and said neck for introducing a stress concentration thereat, and having a discontinuous transition at a respective one of said edges of contact.

15. A blade according to claim 14 wherein said undercut is arcuate at said edge of contact and breaks away from said outer face at an acute angle.

16. A blade according to claim 15 wherein said undercut varies in radius between said edge of contact and said neck to minimize reduction in area of said neck.

17. A blade according to claim 15 in combination with said rotor disk, and being disposed in said disk slot, and wherein said slot is defined between a pair of disk lobes having said inner faces up to said edges of contact for maximizing contact area therebetween.

18. A combination according to claim 17 wherein said inner faces are straight along said dovetail lobes to said edges of contact, and arcuate along said edges of contact.

19. A blade according to claim 15 wherein said inner faces are straight along said dovetail lobes to said edges of contact, and arcuate along said edges of contact.

* * * * *